United States Patent
Moidu et al.

(10) Patent No.: US 6,643,446 B2
(45) Date of Patent: Nov. 4, 2003

(54) HERMETIC FIBER FERRULE AND FEEDTHROUGH

(75) Inventors: Abdul Jaleel K. Moidu, Nepean (CA); William Thomas Moore, Ottawa (CA)

(73) Assignee: JDS Uniphase Inc., Ottawa (CA)

( * ) Notice: Subject to any disclaimer, the term of this patent is extended or adjusted under 35 U.S.C. 154(b) by 0 days.

(21) Appl. No.: 09/993,612

(22) Filed: Nov. 27, 2001

(65) Prior Publication Data

US 2003/0099453 A1 May 29, 2003

(51) Int. Cl.⁷ .................................. G02B 6/00
(52) U.S. Cl. ........................................ 385/138
(58) Field of Search ..................... 358/138, 76–78, 358/88, 83, 92

(56) References Cited

U.S. PATENT DOCUMENTS

| | | | |
|---|---|---|---|
| 4,904,046 A | 2/1990 | Paschke et al. | 350/96.2 |
| 5,143,531 A | 9/1992 | Kramer | 65/3.11 |
| 5,177,806 A | 1/1993 | Abbott et al. | 385/76 |
| 5,305,413 A | 4/1994 | Payne | 385/128 |
| 5,745,626 A | 4/1998 | Duck et al. | 385/96 |
| 5,970,194 A | 10/1999 | Dunn et al. | 385/95 |
| 6,088,504 A | 7/2000 | Filas et al. | 385/138 |
| 6,216,939 B1 | 4/2001 | Thackara | 228/124.6 |
| 6,292,615 B1 | 9/2001 | Merritt et al. | 385/138 |

FOREIGN PATENT DOCUMENTS

| | | | |
|---|---|---|---|
| DE | 372367 A | * | 1/1989 |
| SU | 1821837 A | * | 6/1993 |

* cited by examiner

*Primary Examiner*—Khiem Nguyen
(74) *Attorney, Agent, or Firm*—Neil Teitelbaum

(57) ABSTRACT

The invention provides a hermetic fiber-optic seal, such as in an optical fiber ferrule or feedthrough, having an optical fiber, a glass solder for encasing at least a portion of the optical fiber, a first glass sleeve for encasing at least a first portion of the glass solder, a second glass sleeve for encasing at least a second portion of the glass solder, and an outer sleeve for encasing at least a portion of the first glass sleeve and the second glass sleeve. A gap filled with glass solder may be provided between the first glass sleeve and the second glass sleeve. The hermetic fiber-optic seal is made by an extrusion process.

12 Claims, 4 Drawing Sheets

$\alpha_{155} < \alpha_{110} < \alpha_{120}$

HERMETIC FIBER FERRULE AND FEEDTHROUGH

FIELD OF THE INVENTION

The present invention relates to hermetic fiber ferrules and feedthroughs and a method for making hermetic fiber ferrules and feedthroughs.

BACKGROUND OF THE INVENTION

Optical fibers are used in a wide variety of applications ranging from telecommunications to medical technology and optical components.

It is desirable to hermetically seal optical devices in a housing to prevent deterioration in performance due to moisture and other species present in the atmosphere. Furthermore, it is desirable to improve the reliability of optical fibers in hermetically sealed fiber ferrules and feedthroughs.

A number of fiber optic applications require optical fibers to be packaged in a ferrule, such as a metal, glass, or ceramic ferrule, so that the fiber tip can be aligned and fixed with respect to an optical component. For a variety of applications it is desirable that such a ferrule is a hermetic ferrule. Further, in certain applications it is necessary to bring an optical fiber into a sealed package which requires a hermetic fiber feedthrough. Herein arises the need for a satisfactory method to hermetically seal optical fibers within fittings or sleeves.

Device packages that incorporate an optical or optoelectronic component have an aperture for the feedthrough of the optical fibers that conduct light to or from the package. It has been usual practice to support the connecting portion of the fibers in a metal sleeve and then for the sleeve to be mounted in the aperture, the fibers being held in the sleeve by a metal solder or epoxy resin.

If a fiber is to be soldered into the sleeve it is common practice to metallize the fiber so that the metal solder will adhere to the fiber and the additional handling of the delicate fiber during the metallization process can cause damage.

An epoxy process, on the other hand, does not provide hermeticity as moisture and gases can diffuse through the epoxy adhesive. In addition, there is a slow release of gases from the resin (even after heat treatment) and the gases that are discharged can be harmful to components within the package.

U.S. Pat. No. 5,143,531 in the name of Kramer issued on Sep. 1, 1992 discloses a glass-to-glass hermetic sealing technique which can be used to splice lengths of glass fibers together. A solid glass pre-form is inserted into the cavity of a metal component which is then heated to melt the glass. An end of an optical fiber is then advanced into the molten glass and the entire structure is cooled to solidify the glass in sealing engagement with the optical fiber end and the metal cavity.

Another U.S. Pat. No. 5,337,387 in the name of the same inventor issued Aug. 9, 1994 and relates to a method of the continuous processing of hermetic fiber optic components and the resultant fiber optic-to-metal components by assembling and fixturing elements comprising a metal shell, a glass pre-form and a metal-coated fiber optic into desired relative positions and then sealing said fixtured elements, preferably using a continuous heating process.

U.S. Pat. No. 5,177,806 issued on Jan. 5, 1993 to Abbott et al. discloses an optical fiber feedthrough using a glass seal for sealing the optical fiber within the metal sleeve. The hermetic seal between the optical fiber and the feedthrough sleeve is accomplished utilizing the glass solder. The stripped fiber is fed through a capillary in the glass pre-form. During a subsequent heat treatment the pre-form is heated to its flow temperature so that it forms a seal between the fiber and the sleeve.

A bare optical fiber, stripped of its protective outer cover is particularly vulnerable to damage during manufacturing and assembly. This vulnerability increases fiber failures in the field and during operation which is the predominant failure mode of fiber ferrules and feedthroughs and hence raises the cost of operation and maintenance of an optical fiber system. The long-term reliability of an optical fiber is increasingly important with increasing bandwidth capability. Therefore, there is a need for a more robust optical fiber hermetic seal.

Methods are known for placing and affixing optical fibers in ferrules and sleeves of different types for the purpose of providing a protective sheath for reducing damage to optical fibers that would otherwise be exposed, and for attempting to provide a housing for optical fibers. Furthermore, a centering of stripped fibers within a capillary, as commonly done in the prior art, is a delicate task involving great risk of causing damage to the fiber. The small clearance between the sleeve and the fiber make it very difficult to insert the fiber without damage, such as scratches or nicks in the fiber, which will result in a weak joint and can eventually lead to fiber breakage.

It is an object of the present invention to provide a method for making a hermetic fiber ferrule and/or feedthrough using a novel glass solder process.

It is an object of the invention to provide a method for making a hermetic fiber ferrule and/or feedthrough based on an extrusion method.

It is a further object of the present invention to provide a reliable hermetic fiber ferrule and/or feedthrough utilizing a glass solder process.

SUMMARY OF THE INVENTION

In accordance with the invention there is provided, a hermetic fiber-optic seal comprising an optical fiber, a glass solder for encasing at least a portion of the optical fiber, a first glass sleeve for encasing at least a first portion of the glass solder, a second glass sleeve for encasing at least a second portion of the glass solder, and an outer sleeve for encasing at least a portion of the first glass sleeve and the second glass sleeve.

In accordance with an embodiment of the invention, the hermetic fiber-optic seal comprises a gap between the first glass sleeve and the second glass sleeve, said gap being filled with the glass solder.

In accordance with another aspect of the invention, there is provided, a method of hermetically sealing at least a portion of an optical fiber comprising the steps of providing a length of optical fiber, providing a first glass sleeve having a first bore therethrough, providing a second glass sleeve having a second bore therethrough, providing a glass solder pre-form having a third bore therethrough, said glass solder pre-from being disposed between the first glass sleeve and the second glass sleeve such that the first bore, the second bore, and the third bore are substantially aligned, providing an outer sleeve for encasing the glass solder pre-form and at least a portion of the first glass sleeve and the second glass sleeve, inserting said length of optical fiber through the substantially aligned first bore, second bore, and third bore, providing a pre-load to the first glass sleeve, the second glass sleeve, and the glass solder pre-form, and heating at least a portion of said outer sleeve for extruding the glass solder pre-form between the optical fiber and said first and second glass sleeve.

In accordance with another aspect of the invention a hermetic fiber ferrule is made in accordance with the method of the present invention.

In accordance with another aspect of the invention a hermetic fiber feedthrough is made in accordance with the method of the present invention.

In accordance with the invention there is further provided a hermetic fiber-optic ferrule comprising an optical fiber, a glass solder for encasing at least a portion of the optical fiber, a first glass sleeve for encasing at least a first portion of the glass solder, and an outer sleeve for encasing at least a portion of the first glass sleeve.

In accordance with an embodiment of the invention, the hermetic fiber-optic ferrule further comprises a second glass sleeve for encasing at least a second portion of the glass solder, said outer sleeve further encasing at least a portion of the second glass sleeve.

Advantageously, the present invention uses a pre-load to extrude glass solder pre-form through the sleeves. This enables the use of a relatively loose tolerance (inexpensive), large internal diameter (ID) solder glass pre-form and glass sleeves. The large ID, apart from facilitating an easy insertion, is further important in that it avoids abrasion damage to the fiber and thus increasing the strength and joint reliability of the hermetic fiber optic seal.

The present invention further allows a polishing of the fiber terminus, in the case of ferrule application, with ease, wherein one end of the hermetic fiber ferule is polished to a given specification.

A further advantage of the present invention is that the use of glass sleeves reduces thermal damage to the polymer buffer in the case of feedthrough and ferrule applications.

The application of a small tension to the fiber is advantageously employed to counter wetting forces which tend to de-center the fiber.

BRIEF DESCRIPTION OF THE DRAWINGS

Exemplary embodiments of the invention will now be described in conjunction with the following drawings wherein like numerals represent like elements, and wherein.

DETAILED DESCRIPTION OF THE INVENTION

The present invention provides a hermetic fiber-optic seal and a method for making such hermetic seal. Advantageously, the hermetic fiber-optic seal in accordance with the present invention provides a hermetic fiber ferrule or feedthrough having a good reliability. The hermetic fiber-optic seal and the process in accordance with the instant invention for making a hermetic fiber-optic seal is described below. The optical fiber is hermetically sealed in a ferrule using a glass soldering process for two main applications. The first application is a hermetic fiber ferrule wherein the optical fiber is end-stripped and packaged in a ferrule. The fiber end (terminus) is then polished in accordance with predetermined specifications. The second main application for hermetic fiber-optic seals is a hermetic fiber feedthrough wherein the optical fiber is window-stripped and sealed in a ferrule.

Figure 1:
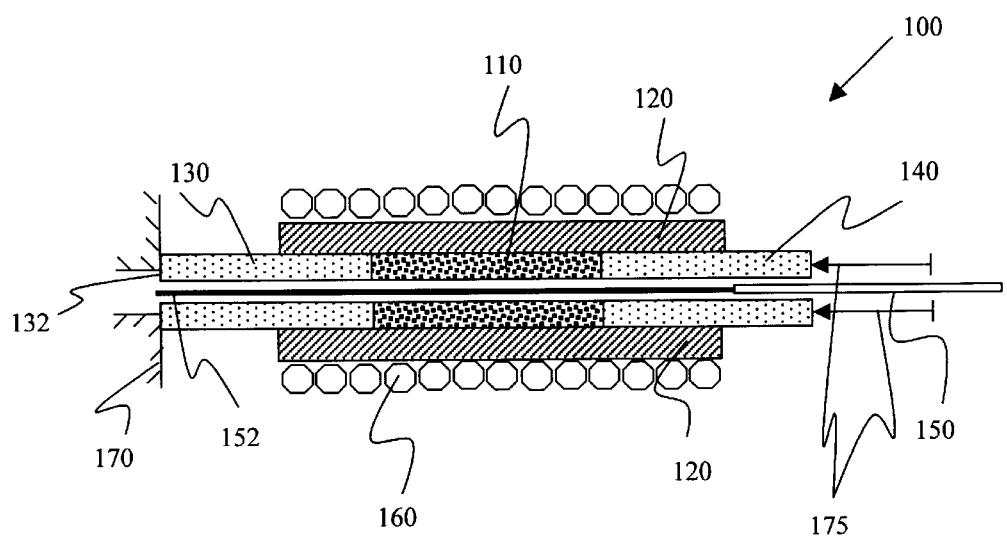
FIG. 1 is a schematic cross-sectional view of a fiber ferrule assembly of the present invention prior to the application of heat.

Reference is now being made to FIG. 1 showing a schematic cross-sectional view of a fiber ferrule assembly 100 of the present invention prior to the application of heat. A glass solder pre-form 110 is custom designed to meet predetermined specifications using commercially available solder glass materials, such as lead borate glasses having a matrix of ceramic fillers. As seen in FIG. 1, the glass solder pre-form 110 is stacked inside an outer sleeve 120, such as a metal, ceramic, or glass ferrule, between a first glass sleeve 130 and a second glass sleeve 140, wherein the bores of the first and the second glass sleeve and the glass solder pre-form are aligned. In accordance with an embodiment of the present invention, the first and the second glass sleeve 130 and 140 are borosilicate glass sleeves having a melting point of approximately 1200° C. Alternatively, other glass materials having a substantially higher melting point than the solder glass material are chosen, for example quartz having a melting point of about 1600° C. The glass sleeves 130 and 140 and the pre-form 110 have a relatively large inner diameter in comparison to the diameter of a fiber 150 which is centered within the bores through glass sleeves 130 and 140 and the glass solder pre-form 110.

As seen in FIG. 1, fiber 150 has an end-stripped portion 152 which protrudes a short distance beyond an end face 132 of the first sleeve 130. The first and the second glass sleeve 130 and 140 protrude outside the outer sleeve 120. The outer sleeve 120 is heated, for example by means of an inductive heater element 160 surrounding the outer sleeve, to a temperature (ca. 450° C.) at which the glass solder melts. However, the material for the first and the second glass sleeve 130 and 140 is chosen such that their melting point is higher than the melting point of the pre-form 110 so that the glass sleeves 130 and 140 maintain their solid shape during the extrusion process.

Figure 2:
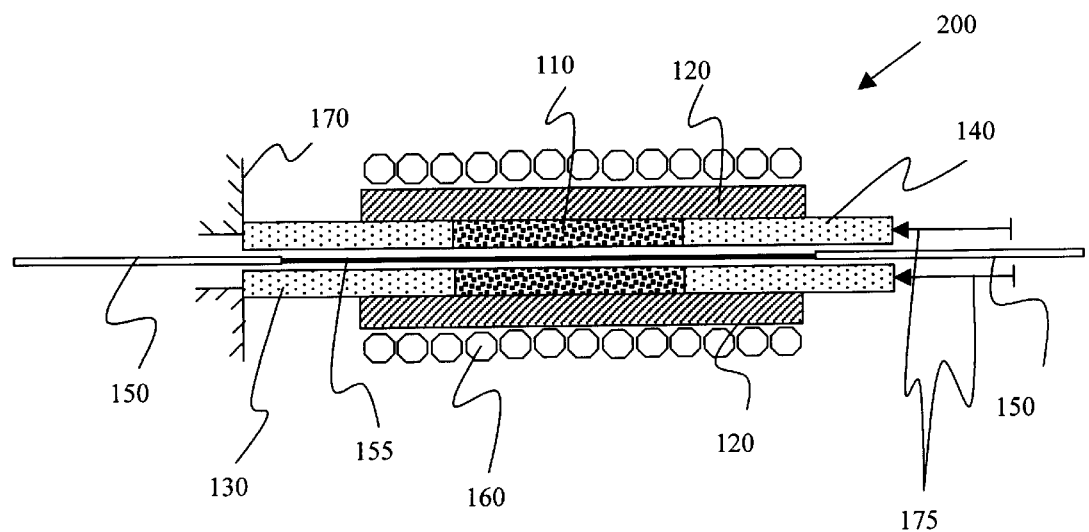
FIG. 2 is a schematic cross-sectional view of a fiber feedthrough assembly of the present invention prior to the application of heat.

FIG. 2 shows a schematic cross-sectional view of a fiber feedthrough assembly 200 of the present invention prior to the application of heat. Again, the glass solder pre-form 110 is stacked inside an outer sleeve 120 between a first glass sleeve 130 and a second glass sleeve 140, wherein the bores of the first and the second glass sleeve and the glass solder pre-form are aligned. The glass sleeves 130 and 140 and the pre-form 110 have a relatively large inner diameter in comparison to the diameter of the fiber 150 which is centered within the bore through the glass sleeves 130 and 140 and the glass solder pre-form 110. In accordance with this fiber feedthrough embodiment of the invention, the fiber 150 has a window-stripped portion 155 within the first and the second glass sleeve 130 and 140 and the glass solder pre-form 110.

In accordance with an embodiment of the present invention a pre-load is used to extrude the molten glass solder through the tubular structures. As depicted in FIGS. 1 and 2, the glass sleeves 130 and 140 and the glass solder pre-form 110 are kept under a pre-load by means of a spring 175 and stopping means 170. The spring 175 is designed and provided with a pre-load such that glass sleeve 140 moves into the outer sleeve by a predetermined amount when the glass solder pre-form 110 melts. The extrusion process ensures that the glass solder is forced in between the glass sleeves and the fiber, thereby bonding the glass sleeves and the fiber together under formation of a joint that is largely free from porosity.

In accordance with a further embodiment of the present invention, it is important that the fiber does not come in physical contact with any of the surfaces of the glass sleeves 130, 140 or the pre-form 110 while it is being inserted and centered within the sleeves and the pre-form, in order to preserve a strength of the end-stripped or window-stripped portion of the fiber. This is particularly important in the vicinity of the joint edges which support most of the external stresses. The present invention achieves this by using a large clearance between the sleeves, the pre-form and the fiber, and by means of external jigging to center the fiber within the sleeves and the pre-form. For example, in accordance with an embodiment of the present invention the outer diameter of the fiber is 125 $\mu$m and the inner diameter of the glass sleeves and the pre-form is 600 $\mu$m. Thus, the large inner diameter of the glass sleeve provides for an easy insertion of the fiber into the sleeves without causing abrasion damage to the fiber, and particularly preventing abrasion damage to the stripped portion of the fiber. During the external jigging, an unstripped portion of fiber 150 is centered within the sleeves and the pre-form and then the sleeves and pre-form assembly is moved over the window-stripped or end-stripped portion of fiber 150 so as to prevent abrasion damage to the fiber.

Figure 3:
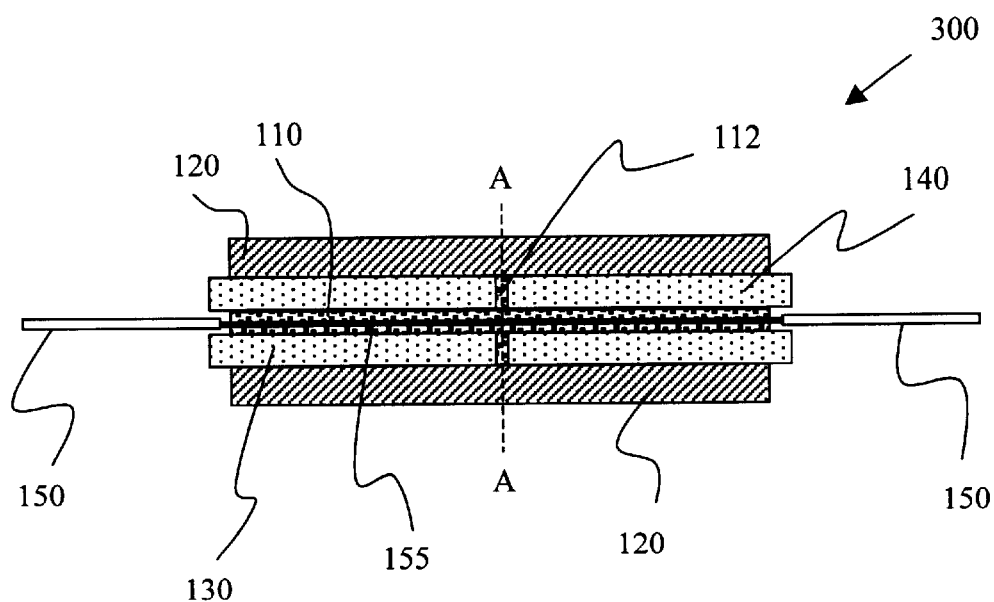
FIG. 3 shows a schematic cross-sectional view of a hermetic fiber feedthrough after the application of heat to the assembly of FIG. 2 comprising a compressive seal.

FIG. 3 shows a schematic cross-sectional view of a hermetic fiber feedthrough 300 after the application of heat to assembly 200 of FIG. 2. When heat is applied to the outer sleeve 120, the glass solder pre-form 110 melts and the pre-load forces the glass sleeves 140 to move toward glass sleeve 130. This causes an extrusion process of the pre-form 110 and the glass solder is forced to flow along the fiber and fill the void between the fiber 150 and the internal wall of the glass sleeves 130 and 140. In accordance with the embodiment of the present invention presented in FIG. 3, the glass sleeves 130 and 140 do not abut after the extrusion process is performed. A small gap 112, e.g. in the order of a few millimeter, filled with glass solder remains between the first glass sleeve 130 and the second glass sleeve 140. The presence of gap 112 provides for the formation of a compressive seal as is explained in more detail in conjunction with FIG. 3a. The length of the gap is chosen in dependence upon the size requirements of the hermetic seal, for example in the range from about 1 mm to about 3 mm.

The dimensions of the hermetic fiber-optic seals provided in accordance with the present invention are chosen so as to make a compressive seal for specified applications.

In accordance with the compressive seal embodiment of the present invention, the materials for the outer sleeve and the solder pre-form are selected with suitable coefficients of thermal expansion such that a largely compressive state of stress is created in the solder material and on the fiber. In order to determine a suitable dimension of such a structure, a theoretical stress analysis is performed. This is done to ensure that there are no micro-cracks within the solder material so that a hermetic seal is assured.

Figure 3A:
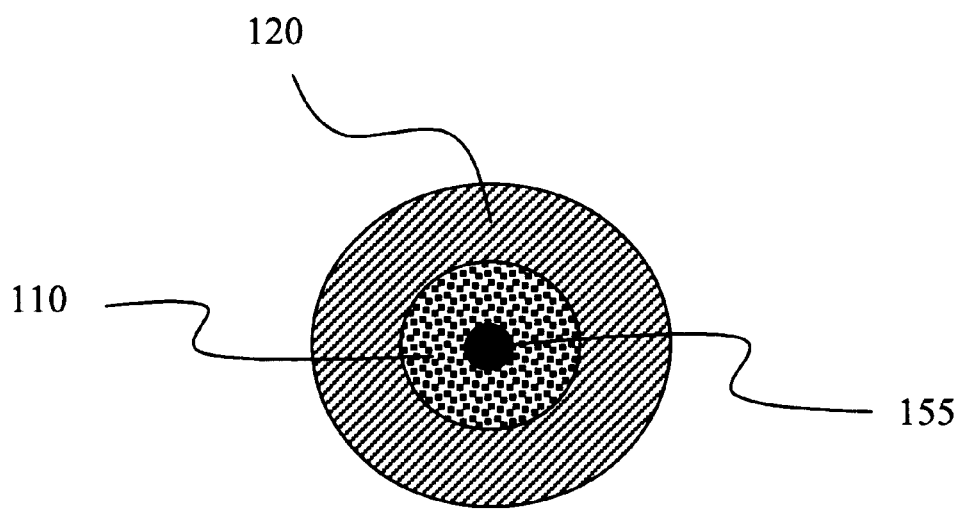
FIG. 3a shows a schematic cross-sectional view of the gap of the hermetic fiber feedthrough of FIG. 3.

FIG. 3a shows a schematic cross-sectional view along line A—A through the gap 112 of the hermetic fiber feedthrough 300 of FIG. 3 comprising a compressive seal. As is shown in FIG. 3a, the stripped portion of the fiber 155 is surrounded by the glass solder 110 which in turn is surrounded by the outer sleeve 120. The materials of the glass solder 110 and the outer sleeve 120 are chosen such that a coefficient of thermal expansion is smallest for the fiber, followed by the glass solder, and largest for the outer sleeve, as indicated below:

$$\alpha_{155} < \alpha_{110} < \alpha_{120}$$

This means, that after the extrusion process is stopped and the thus prepared hermetic seal is cooled, the outer sleeve 120 contracts more than the glass solder 110 and the stripped fiber 155. Further, the glass solder also contracts more than the stripped fiber. Thus a compressive seal is formed, as a result of the fact that the outer layers contract more than the inner layers. This applies also in an analogous manner to the hermetic fiber ferrule embodiment presented in conjunction with FIG. 1.

The formation of such a compressive seal is further advantageous with respect to the prevention of micro-cracks since a growth of potential micro-cracks is thwarted under compressive forces.

Figure 4:
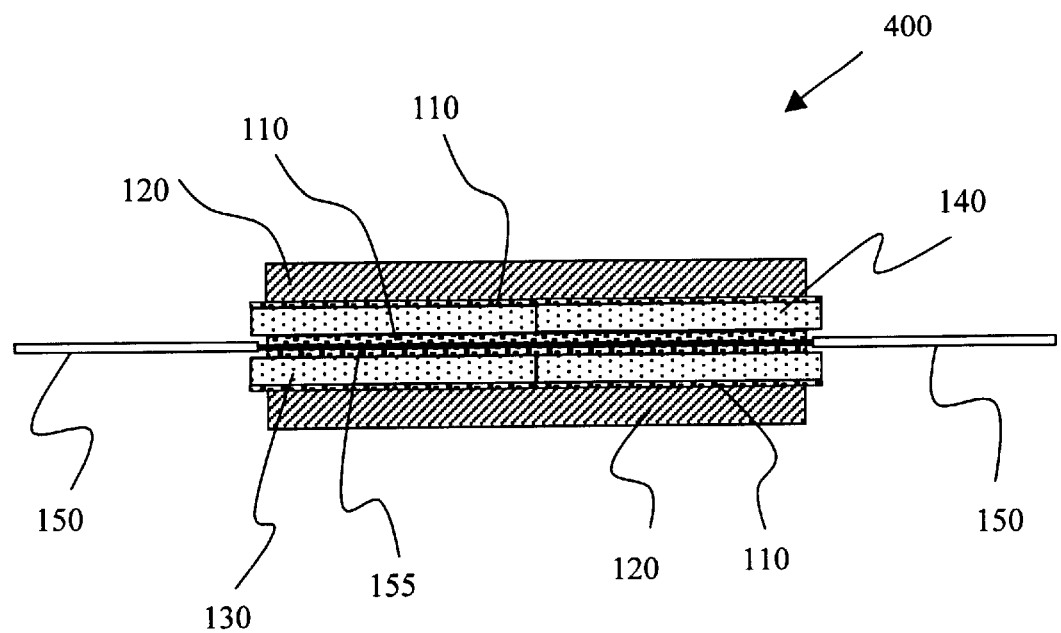
FIG. 4 shows a schematic cross-sectional view of a hermetic fiber feedthrough after the application of heat to the assembly of FIG. 2 wherein the first and the second glass sleeve abut in the prepared hermetic seal.

FIG. 4 shows a schematic cross-sectional view of a hermetic fiber feedthrough 400 after the application of heat to assembly 200 of FIG. 2 in accordance with a further embodiment of the present invention wherein the first glass sleeve 130 and the second glass sleeve 140 abut in the thus prepared hermetic seal. In accordance with this embodiment of the invention, the outer diameter of the glass sleeves 130 and 140 is chosen so as to allow some of the glass solder to flow between the glass sleeves 130 and 140 and the outer sleeve 120 to form a hermetic seal during the extrusion process.

Figure 5:
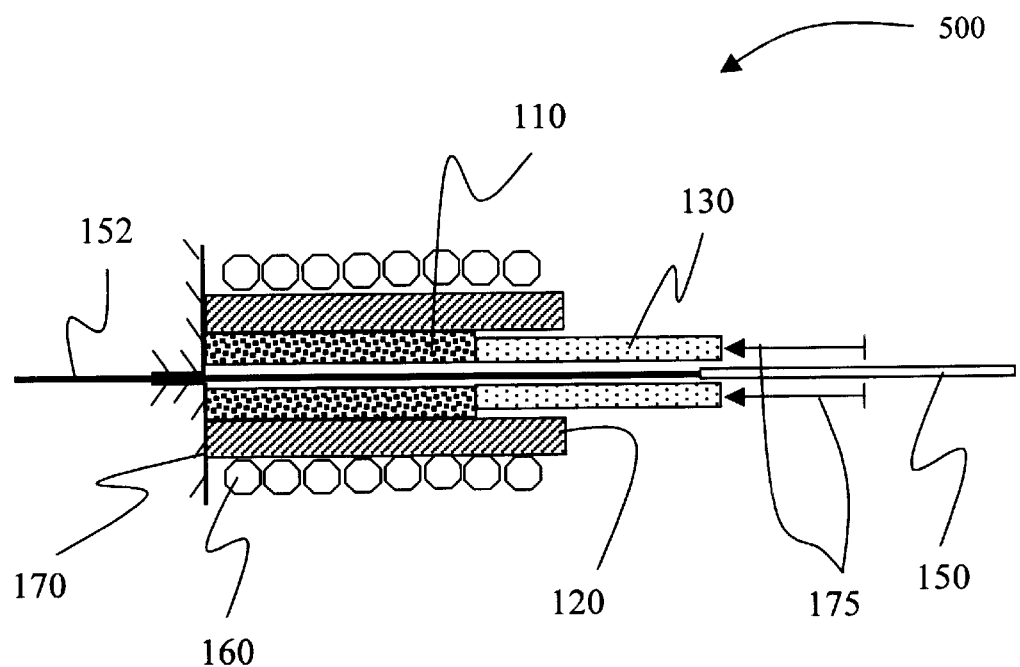
FIG. 5 is a schematic cross-sectional view of a fiber ferrule assembly of the present invention prior to the application of heat comprising a single glass sleeve.
Figure 6:
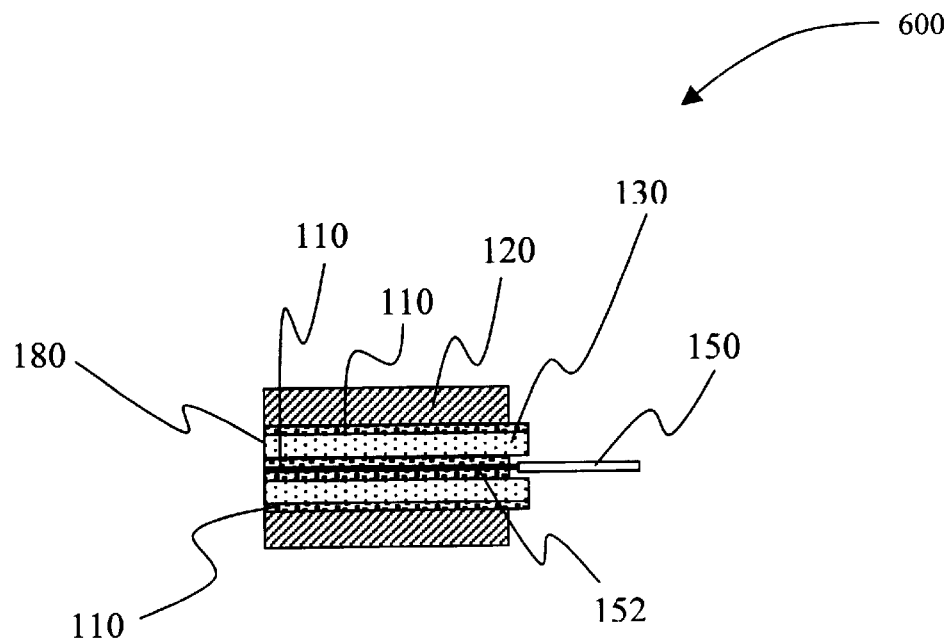
FIG. 6 is a schematic cross-sectional view of a fiber ferrule after the application of heat to the assembly of FIG. 5.

Turning now to FIG. 5, a schematic cross-sectional view of a fiber ferrule assembly 500 is shown prior to the application of heat. The fiber ferrule assembly employs a single glass sleeve 130. The glass solder pre-form 110 is stacked inside outer sleeve 120 next to glass sleeve 130. The bores of the pre-form 110 and the glass sleeve 130 are aligned to each other and a pre-load is applied to the pre-form 110 and the glass sleeve. The optical fiber 150 having an end-stripped portion 152 is centered within the bores of the pre-form 110 and glass sleeve 130. Upon the application of heat through the inductive heater 160 on outer sleeve 120, the pre-form 110 begins to melt and glass sleeve 130 is forced towards stopping means 170 through tension means 175 causing an extrusion of pre-form 110. The extrusion of the glass solder pre-form 110 forces the glass solder to fill a gap between the end-stripped portion of fiber 152 within the bore of glass sleeve 130 and thereby bonding the glass sleeve and the fiber together. Furthermore, as shown in FIG. 5, the outer diameter of glass sleeve 130 is chosen such that the melted glass solder can also flow between the glass sleeve 130 and the outer sleeve 120 to bond these sleeves together. The resulting hermetic joint is shown in conjunction with FIG. 6 presenting a schematic cross-sectional view of a hermetic fiber ferrule 600 after the application of heat to assembly 500 of FIG. 5. An end face 180 is polished to required specification.

Advantageously, the use of the first glass sleeve 130 in the fiber ferrule assembly shown in FIG. 1 readily facilitates a polishing of the fiber terminus of the end-stripped portion 152 of fiber 150 to a given specification, for example a polishing to a specified angle. In accordance with an embodiment of the present invention, the polishing angle ranges from approximately 6 to 12 degrees.

In accordance with yet another embodiment of the present invention, the use of the second glass sleeve 140 assists in preventing the polymer buffer of the optical fiber from burning so that fiber 150 remains its strength and reliability. The thermal degradation of the buffer material around fiber 150 occurs at a lower temperature than the melting point of the glass solder material. Since glass is a relatively sluggish thermal conductor, the glass sleeve 140 ensures that the temperature gradient is relatively steep so as to prevent thermal damage of the polymer coating that is captured inside the second glass sleeve 140 but outside the outer sleeve 120, as seen in FIG. 1.

The extrusion process is designed such that the extruded pre-form 110 does not come in contact with the polymer coating on the fiber 150. For example, in accordance with an embodiment of the invention, a gap of about 1 mm of stripped fiber remains between the extruded glass solder and the polymer coated fiber, i.e. an unstripped portion of fiber 150, so that the extruded glass solder does not come in contact with the polymer coating. In order to do so, an edge of the advancing extruded glass solder is detected, for example by means of automatic or manual detection means. Once the edge of the advanced glass solder front is detected, heating means 160, such as an inductive heater, is turned off. If automatic detection means are employed, the data received from the detection means are fed to a heating control means to turn off heating means 160. The flow of the glass solder retards as soon as the heating is stopped.

The remaining part of the second glass sleeve 140 is then filled with a flexible adhesive material so as to recoat a small length of the stripped portion of fiber 150 and to provide adequate strain relief for fiber 150 in bending.

In accordance with a further embodiment of the present invention, a pre-tension is used in fiber 150 to obviate a de-centering of the fiber caused by the wetting forces that are generated when the glass solder melts. Once the glass solder melts, it tends to flow along the fiber creating a force on the fiber which tries to de-center it. Hence, in order to resist the tendency of the fiber to deflect a pre-tension is applied.

Commercial glass solder material is chosen to be chemically compatible with the fiber so that the fiber is not chemically damaged during the extrusion process. Incompatibilities between the fiber and the glass solder material can reduce the strength of the hermetic fiber ferrule or feedthrough.

The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. A hermetic fiber-optic seal comprising:
   an optical fiber;
   a glass solder for encasing at least a portion of the optical fiber;
   a first glass sleeve for encasing at least a first portion of the glass solder;
   a second glass sleeve for encasing at least a second portion of the glass solder, the first glass sleeve and the second glass sleeve being serially disposed about the optical fiber; and
   an outer sleeve for encasing at least a portion of the first glass sleeve and the second glass sleeve.

2. The hermetic fiber-optic seal as defined in claim 1 further comprising a gap between the first glass sleeve and the second glass sleeve, said gap being filled with the glass solder for forming a compressive seal.

3. The hermetic fiber-optic seal as defined in claim 1 wherein the first glass sleeve and the second glass sleeve abut.

4. The hermetic fiber-optic seal as defined in claim 1 wherein the encased portion of the optical fiber is window-stripped.

5. The hermetic fiber-optic seal as defined in claim 1 wherein the encased portion of the optical fiber is end-stripped.

6. The hermetic fiber-optic seal as defined in claim 5 wherein the end-stripped encased portion of the optical fiber is polished.

7. The hermetic fiber-optic seal as defined in claim 1 wherein the outer sleeve is made from metal, metallic alloy, ceramic, or glass.

8. A method of hermetically sealing at least a portion of an optical fiber comprising the steps of:
   providing a length of optical fiber;
   providing a first glass sleeve having a first bore therethrough;
   providing a second glass sleeve having a second bore therethrough;
   providing a glass solder pre-form having a third bore therethrough, said glass solder pre-from being disposed between the first glass sleeve and the second glass sleeve such that the first bore, the second bore, and the third bore are substantially aligned;
   providing an outer sleeve for encasing the glass solder pre-form and at least a portion of the first glass sleeve and the second glass sleeve;
   inserting said length of optical fiber through the substantially aligned first, second, and third bore;
   providing a pre-load to the first glass sleeve, the second glass sleeve, and the glass solder pre-form; and
   heating at least a portion of said outer sleeve for extruding the glass solder pre-form between the optical fiber and said first and second glass sleeve.

9. A hermetic fiber ferrule made by the method as defined in claim 8.

10. A hermetic fiber feedthrough made by the method as defined in claim 8.

11. A method of making a hermetic fiber-optic ferrule comprising the steps of:
   providing a length of optical fiber;
   providing a first glass sleeve having a first bore therethrough;
   providing a glass solder pre-form having a second bore therethrough, the glass solder pre-form and the first glass sleeve being serially disposed such that the first bore and the second bore are substantially aligned;
   providing an outer sleeve for encasing the glass solder pre-form and at least a portion of the first glass sleeve;
   inserting said length of optical fiber through the substantially aligned first and second bore;
   providing a pre-load to the first glass sleeve and the glass solder pre-form; and
   heating at least a portion of said outer sleeve for extruding the glass solder pre-form between the optical fiber and the first glass sleeve.

12. The method as defined in claim 11 further comprising the step of providing a pre-tension to the length of optical fiber prior to performing the step of heating at least a portion of the outer sleeve for reducing a de-centering of the length of optical fiber in the substantially aligned first and second bore.

* * * * *